Patented Jan. 5, 1954

2,665,233

UNITED STATES PATENT OFFICE 2,665,233

INSECTICIDES AND INSECTICIDAL COMPOSITIONS

Oscar F. Hedenburg, Pittsburgh, Pa., assignor, by mesne assignments, to Rex Research Corporation, Toledo, Ohio, a corporation of Delaware No Drawing. Application September 5, 1951, Serial No. 245,261

12 Claims. (Cl. 167—33)

This invention relates to new derivatives of safrole, effective as insecticides and as synergists for pyrethrins. The invention provides new and useful safrole derivatives and also an advantageous method of producing these derivatives. The invention also provides improved insecticide compositions containing pyrethrins and also containing my new safrole derivatives as synergist for the pyrethrins.

My new products may be produced by reacting safrole with formaldehyde, as hereinafter described, and may be represented by the structural formula

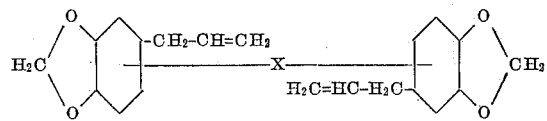

where X is either $CH_2$ or $CH_2$—O—$CH_2$—O—$CH_2$.

These products are, with advantage, produced by heating a mixture of safrole and paraformaldehyde to an elevated temperature and for an extended period, in the presence of a catalyst. During this period of heating, the mixture should be stirred, or in lieu thereof a minor proportion of a material, such for instance, as dioxane, should be included in the mixture, to keep the water of reaction in suspension. Following the heating period, the water is separated from the reaction mixture by distillation and any excess formaldehyde and catalyst remaining in the mixture may be removed by washing with an aqueous solution of ammonium carbonate and sodium bicarbonate.

The reactions involved may be represented graphically by the following equations:

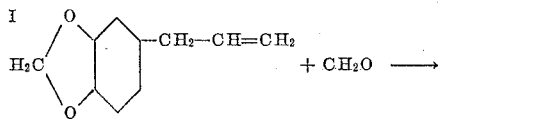

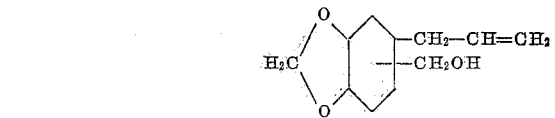

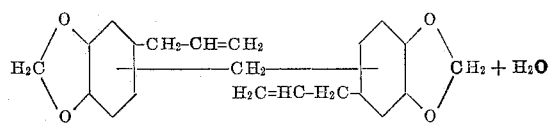

It will be observed that in the reactions represented by the foregoing equations only one mol of formaldehyde is required to react with each 2 mols of safrole. However, in carrying out the process, as just described, there is a further reaction involving the use of 3 mols of formaldehyde for each 2 mols of safrole. This further reaction may be graphically represented by the following equation:

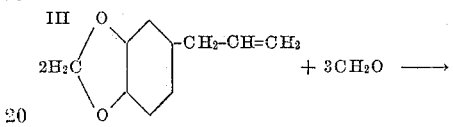

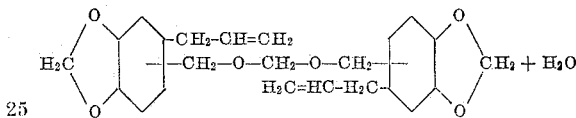

In carrying on the process, I have found it advantageous to use the formaldehyde and safrole in proportions of about 3 mols of formaldehyde, using its equivalent as paraformaldehyde, to each 2 mols of safrole. These proportions may be varied somewhat and I have usually found it especially advantageous to use a slight excess of the paraformaldehyde in order to accelerate the reaction.

As the catalyst, I use one of the known paraformaldehyde-depolymerizing catalysts, advantageously either toluene sulfonic acid, benzene sulfonic acid or naphthalene sulfonic acid. The proportion of catalyst is subject to some variation, but generally should be within the range of about 1% to 2.5%, based on the formula weight, i. e., safrole plus paraformaldehyde. In addition to causing the depolymerization of the paraformaldehyde, these catalysts have been found to promote the reaction represented by Equation I.

The temperature and time of heating in carrying out the process, may also be varied somewhat, but for optimum results I have generally found that the mixture should be heated to about 85° C. and held at this temperature for a period of the order of about 24 to 30 hours.

The removal of the water after the cooking period may be accomplished, for instance, by adding benzene to the reaction mixture and boiling off the water and benzene. Or the water may be removed by heating the mixture in an open flask, for several hours while blowing air through the flask. This step of distilling off the water of reaction, following the heating period serves to complete the reaction resulting in the products of my present invention.

The following specific examples are illustrative of my process. It will be understood, however, that these examples are not to be taken as limitative, but that the proportions and other conditions may be varied somewhat without departing from the scope of my invention.

*Example I*

170.5 grams of safrole (95% pure), 45 grams of paraformaldehyde (containing about 96% $CH_2O$), about 5 grams of toluene sulfonic acid and about 160 grams of dioxane were heated to a temperature of 85° C. for a period of 24 hours, without stirring. At the end of this period, a syrupy reaction mixture was obtained. This reaction mixture was mixed with about 300 cc. of benzene and the resultant solution boiled to eliminate water formed by the reaction.

The mixture thus obtained was then washed with an aqueous solution of 5 grams of ammonium carbonate and 5.2 grams of sodium bicarbonate, the ammonia reacting with any excess formaldehyde present to form the water soluble hexamethylenetetramine and the sodium bicarbonate neutralizing and solubilizing the toluene sulfonic acid catalyst. Thereafter the aqueous solution containing these water soluble reaction products was separated and withdrawn.

The benzene solution was then clarified, filtered and distilled to remove the benzene, the product being heated at 85° C. at reduced pressure until there was no further reduction in weight of the product.

*Example II*

A mixture of 50 grams of the paraformaldehyde, 170 grams of the safrole, 3 grams of benzene sulfonic acid and about 150 grams of dioxane were heated together at a temperature of about 85° C. for a period of 30 hours. Thereafter, the resultant reaction mixture was heated for 3 hours in an open flask to drive off the water formed in the reaction, air being blown through the flask during the heating to assist in the evaporation of the water. The resultant mixture was then treated as described in Example I for the removal of excess formaldehyde and catalyst. The final product was a brown mobile oil containing only a trace of insolubles. The yield of this product was 191 grams.

The foregoing procedure results in the production of a mixture of the product of Equation II and the product of Equation III and, perhaps to a very minor extent, other related compounds. This fact appears from the results of treating the mixture with an alcohol, such for instance, as ethylene glycol, in accordance with the conventional procedure for determining the amount of formaldehyde present as formals. The results of this test, as applied to the product of Example II, for instance, showed that formaldehyde was present as formals in 50 grams of the product, to the extent of 0.064 mol, as compared to an expected value of 0.126 mol, if it be assumed that the product consisted entirely of the compound of Equation III, thus indicating that the two materials were present in approximately equal molar proportions.

For further identification of the reaction products, a sample of the mixture was subjected to infrared spectra analysis by the procedure described in an article entitled "Characterization of benzene ring substitution by infrared spectra" appearing in Analytical Chemistry, vol. 23, No. 5, pp. 709–714, of May 1951. By this test, it was shown that the product was composed of compounds containing tetra-substituted rings, having the terminal vinyl groups of safrole and contained open chain C—O—C bonds.

The effectiveness of this mixture as an insecticide and as a synergist for pyrethrins in insecticidal compositions is shown by tests carried on by the Peet-Grady method, described in Blue Book of 1948, pages 183–5.

By this test procedure, O. T. I. (Official Test Insecticide, composed of 100 milligrams of pyrethrins dissolved in 100 milliliters of petroleum distillate) showed a knockdown of 90% and a kill of 41%. An insecticidal composition composed of 30 milligrams of pyrethrins and 300 milligrams of the product produced according to Exampe II per 100 milliliters of petroleum distillate showed a knockdown of 89% and a kill of 85%.

The synergistic effectiveness of this new product with respect to pyrethrins is further shown by the fact that, by this same test procedure, an insecticidal composition composed of 30 milligrams of pyrethrins in 100 milliliters of petroleum distillate showed a knockdown of 78% and a kill of 24% and an insecticidal composition consisting of 300 milligrams of the product of Example II in 100 milliliters of petroleum distillate showed a knockdown of 12% and a kill of 12%.

The results of these tests clearly indicate that the product of my present invention is a highly effective synergist for pyrethrins, especially with respect to killing power.

I claim:

1. A process which comprises heating a mixture of safrole, paraformaldehyde and a paraformaldehyde-depolymerizing catalyst to an elevated temperature for an extended period and thereafter distilling from the reaction mixture water formed by the reaction.

2. The process of claim 1 in which the mixture is heated to a temperature of about 85° for a period of about 24 to 30 hours.

3. The process of claim 1 in which the depolymerizing catalyst is one selected from the group consisting of toluene sulfonic acid, benzene sulfonic acid and naphthalene sulfonic acid.

4. The process of claim 1 in which the safrole and formaldehyde are used in proportions of about 2 mols safrole to 3 mols formaldehyde, and the amount of catalyst used is 1% to 2.5% based on the formula weight.

5. An organic chemical compound having the structural formula

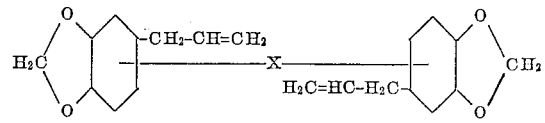

in which X is a radical selected from the group consisting of $CH_2$ and $CH_2$—O—$CH_2$—O—$CH_2$.

6. An organic chemical compound having the structural formula

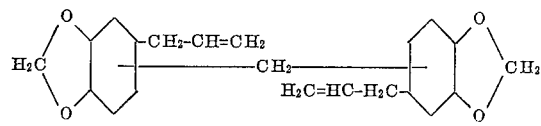

7. An organic chemical compound having the structural formula

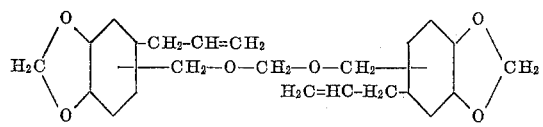

8. A mixture of the organic chemical compounds defined by claims 6 and 7.

9. An insecticidal composition containing pyrethrins and as a synergist therefor the product of claim 5.

10. An insecticidal composition containing pyrethrins and as a synergist therefor the product of claim 6.

11. An insecticidal composition containing pyrethrins and as a synergist therefor the product of claim 7.

12. An insecticidal composition comprising pyrethrins and as a synergist therefor the product of claim 8.

OSCAR F. HEDENBURG.

References Cited in the file of this patent

UNITED STATES PATENTS

| Number | Name | Date |
| --- | --- | --- |
| 2,521,366 | Hedenburg | Sept. 5, 1950 |